April 21, 1953 F. J. LA MERE ET AL 2,635,671
APPARATUS FOR BALLOON CONSTRUCTION
Original Filed April 2, 1948 5 Sheets-Sheet 5
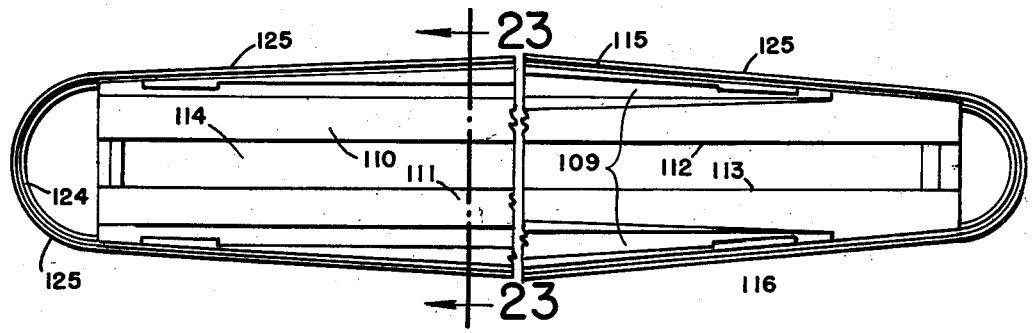
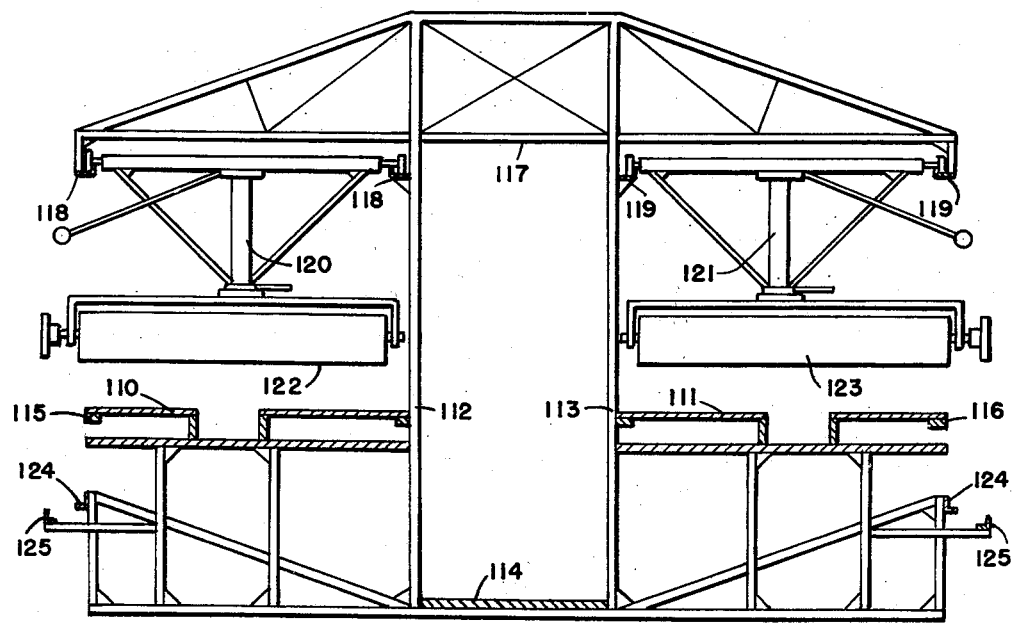
INVENTORS
FRANK J. LAMERE
KERMIT F. JOHNSON
OTTO C. WINZEN
BY *William C. Babcock*
ATTORNEY Patented Apr. 21, 1953

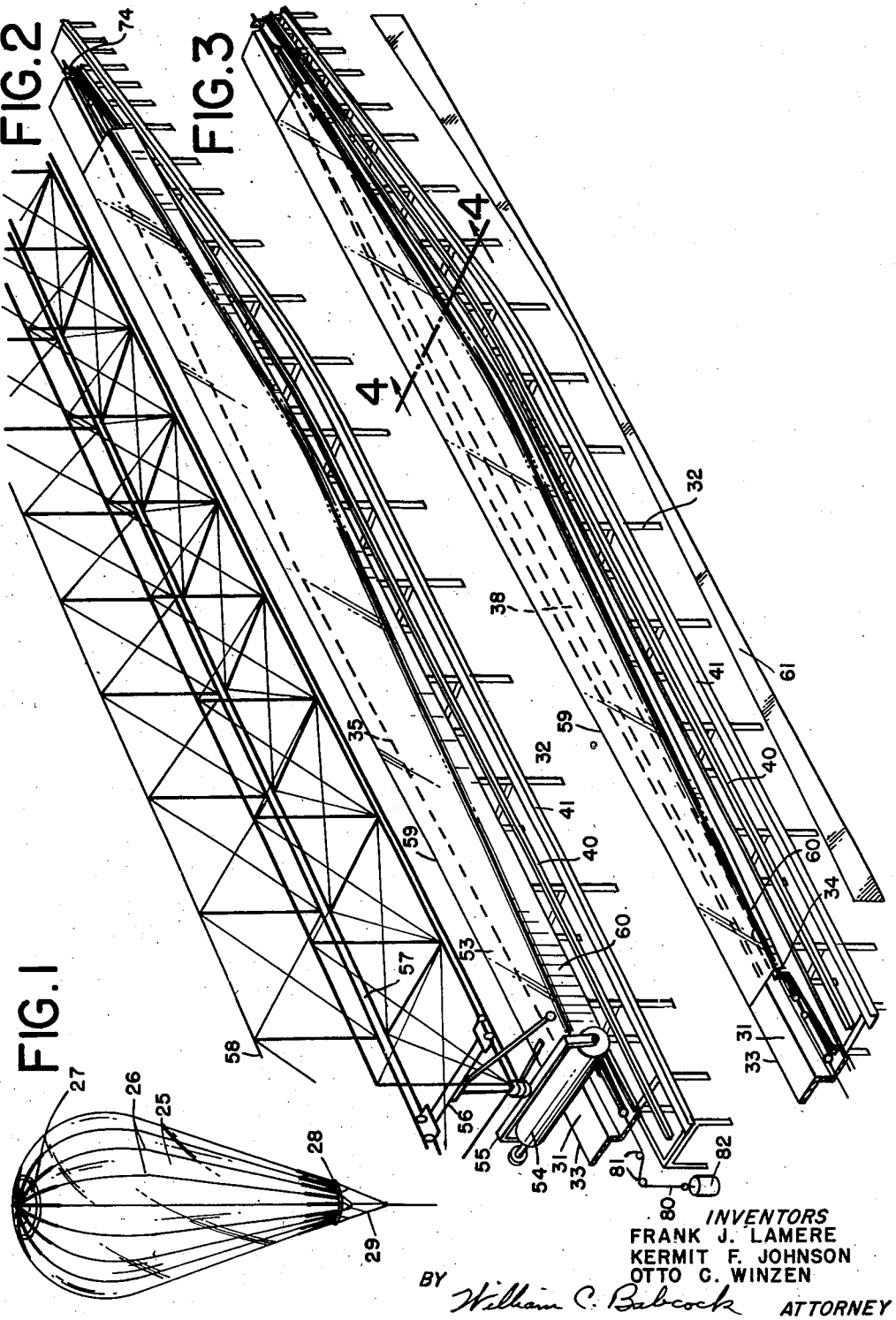

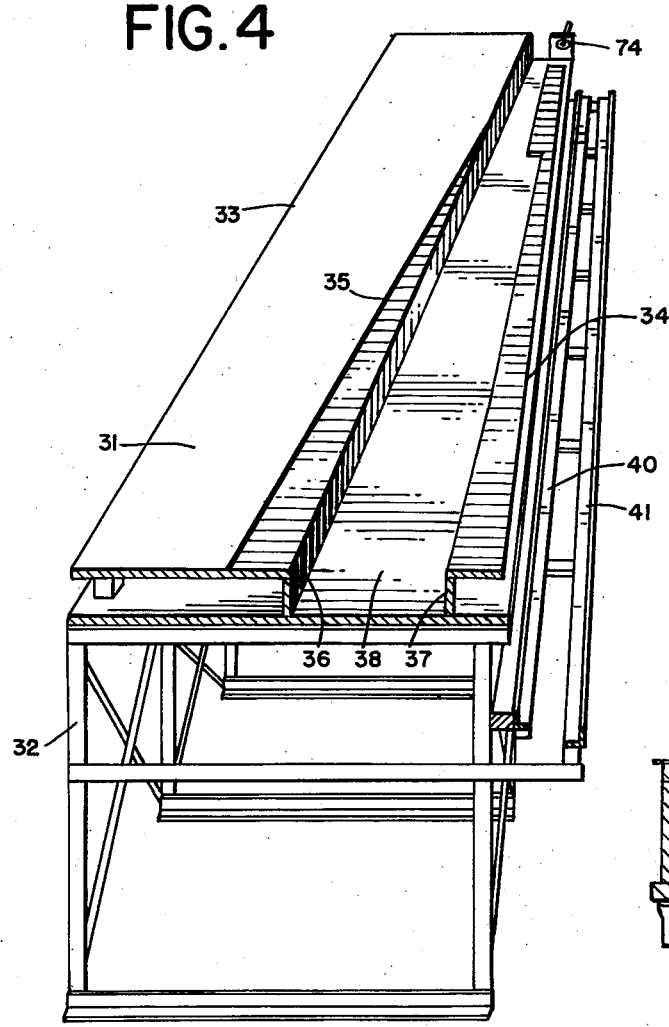
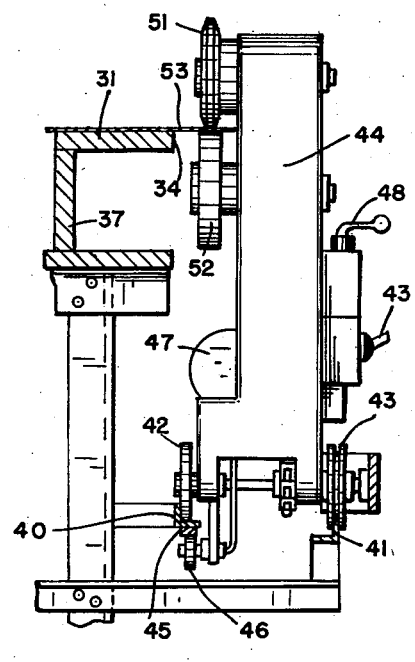

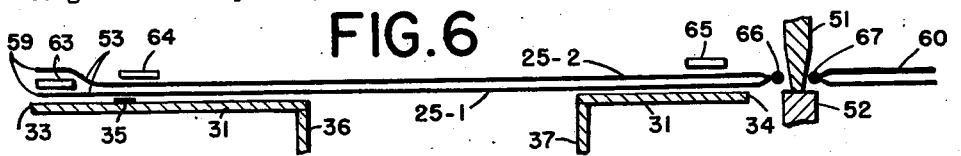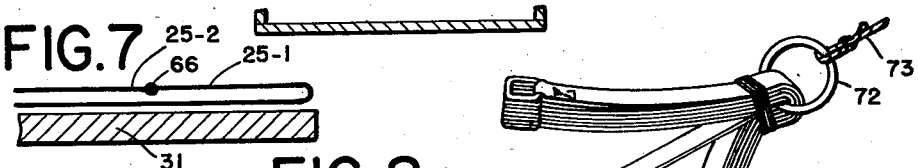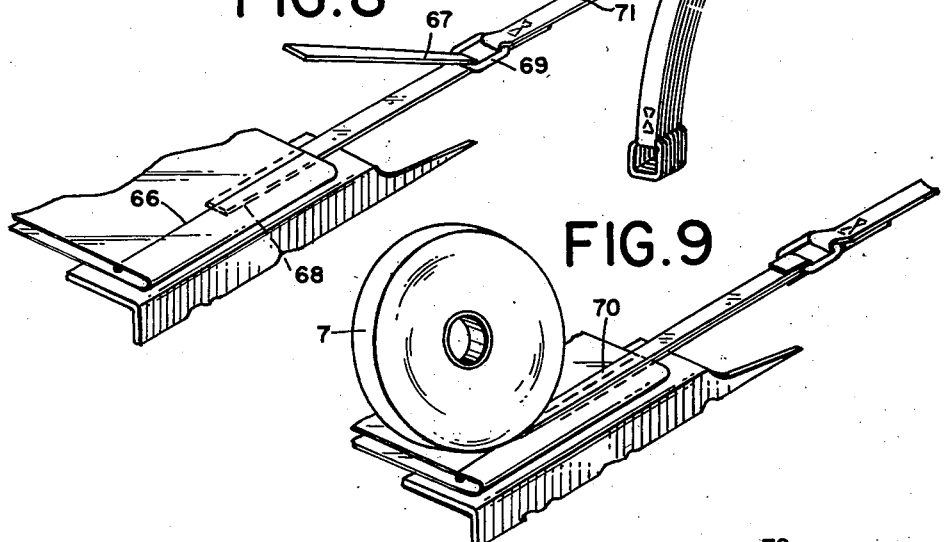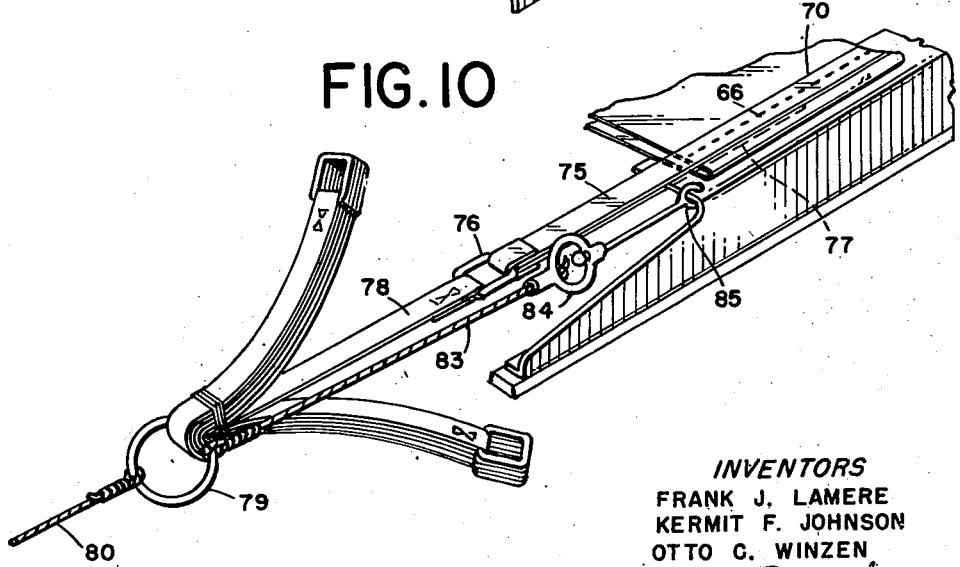

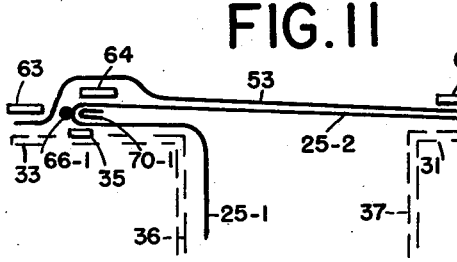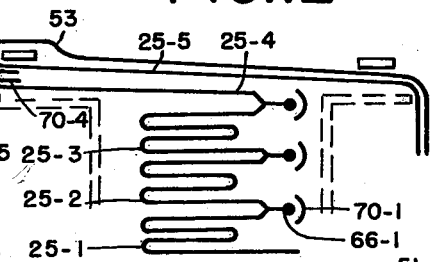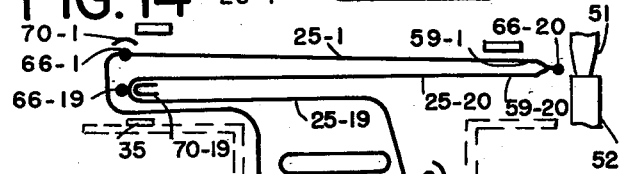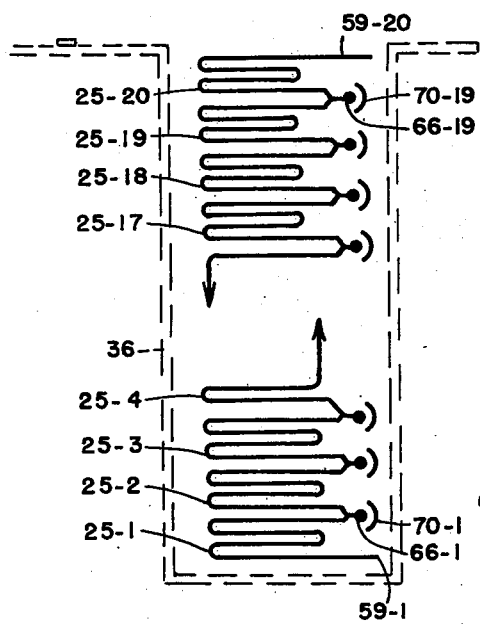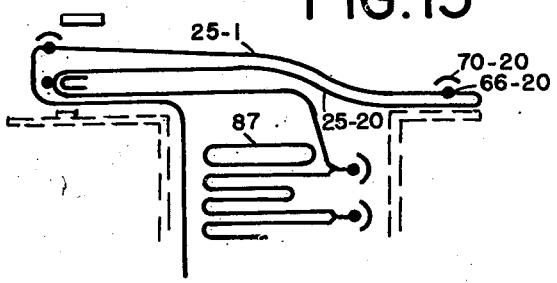

2,635,671

UNITED STATES PATENT OFFICE 2,635,671

APPARATUS FOR BALLOON CONSTRUCTION

Frank J. La Mere, Kermit F. Johnson, and Otto C. Winzen, Minneapolis, Minn., assignors to General Mills, Inc., a corporation of Delaware Original application April 2, 1948, Serial No. 18,585. Divided and this application June 26, 1950, Serial No. 170,662

16 Claims. (Cl. 154—42)

1

This application relates to an apparatus for construction of high-altitude balloons. This application is a division of our prior copending application, Serial No. 18,585, filed April 2, 1948, for "Method and Apparatus for Balloon Construction."

One object of the present invention is the provision of an improved apparatus for manufacture of balloons, according to the method described in the above application.

A further object is to provide a balloon table on which the material may be laid out and assembled with a minimum of handling.

Still another object is the provision of such a table in which an edge of the table is shaped to correspond to the shape of the gore edges in such a balloon.

A still further object is to provide such a table in which a cutting and welding unit is mounted for movement along one edge of the table to trim the balloon material to the desired shape and join adjacent gores of the material together.

An additional object is the provision of a balloon assembly table having at least one edge corresponding in shape to the gores of the finished balloon and having a central depression for accommodation of a portion of the gores during the assembly operation.

Other objects and advantages will be apparent from the following specification in which a preferred embodiment of the invention is described.

In the drawings which form a part of this application, and in which like reference characters indicate like parts, Figure 1 is a perspective view of a balloon made by the present method and apparatus.

Fig. 2 is a perspective view of a balloon assembly table according to the present invention.

Fig. 3 is a view similar to Fig. 2 with certain portions omitted for clearness and with a sheet of balloon material in position on the table.

Fig. 4 is a perspective view of the apex end of the table of Fig. 3 taken from the section line 4—4 of that figure.

Fig. 5 is a schematic view, partially in section, showing the welding unit which forms a part of the balloon assembly table.

Fig. 6 is a partial sectional view showing the lay-out of the first two sheets of gore material as the assembly operation is started.

Fig. 7 is a similar partial view showing the position of the weld line prior to taping of the gore seam.

Fig. 8 is a partial perspective view which illustrates the start of the taping operation at the apex of the balloon.

2

Fig. 9 is a view similar to Fig. 8 with the taping operation at a more advanced stage.

Fig. 10 is a partial perspective view showing details of the completion of the taping operation at the bottom of the balloon.

Fig. 11 is a schematic sectional view showing the arrangement of the gores and gore material prior to making the second gore seam in the series.

Fig. 12 is a view similar to Fig. 11 showing the gores after a number of seams have been joined.

Fig. 13 is a view similar to Fig. 11 after all the gore seams except the final seam have been made.

Fig. 14 is a view similar to Fig. 11 showing the method of laying out the material for the final joint between the first and last gores.

Fig. 15 is a similar view which illustrates the final taping operation of the last seam.

Fig. 16 is a plan view of a modified form of apparatus in which two assembly tables are provided, and Fig. 17 is a sectional view on the line 23—23 of Fig. 16.

With reference to Fig. 1 the balloon for which the present method of assembly and apparatus are designed is composed of a series of vertically extending gores 25 made of suitable gas-proof material. These gores are joined to each other at their vertical edges 26 to form the main body of the balloon. A suitable cap 27 is provided to seal the apex of the balloon. The lower ends of the gores 25 are fastened to a load ring 28 from which the desired load may be suspended by means of suitable load lines 29.

The assembly of such a balloon involves essentially two operations, namely the assembly of the longitudinal gores which form the main body of the balloon and the application of the cap at the apex of said gores. The first of these two steps and the apparatus for carrying it out is described separately below.

Assembly of the Gores

To facilitate the cutting and joining of the gores to each other we have provided a balloon assembly table having a flat upper surface designated generally as 31. This table surface 31 is mounted on any suitable support 32. One edge 33 (Fig. 4) of the table is perfectly straight and is used to align one edge of the sheet of gore material. The opposite edge 34 of the table tapers at each end to correspond to the desired shape of the edge of an individual gore of the balloon. Thus edge 34 will serve as a guide or pattern for the trimming of the gore material and the joining of adjacent gores.

An index line 35 is provided on the top of table 31 to indicate the line of the opposite edge of each gore. Thus the shape of a single gore is defined on the one side by table edge 34 and on the other side by index line 35. Since the gores are symmetrical, the edge 34 and line 35 will taper symmetrically toward each end of the table corresponding to the apex and bottom of the balloon gores.

The intermediate portion of table 31 between edge 34 and index line 35 is recessed or depressed as shown in Fig. 4. This recessed portion has a bottom 38 and side walls 36 and 37 which form in effect a trough extending longitudinally of the table. The depth of this trough or recess is sufficient to accommodate the assembled gores as described below.

On one side of table 31 corresponding to edge 34 tracks 40 and 41 are connected to frame 32. These tracks are designed to support the wheels or rollers 42 and 43 respectively of a welding unit 44. An electric conducting strip 45 on the bottom of rail 40 is suitably insulated from said rail and cooperates with a contact roller 46 on the welding unit to supply current to a driving motor 47 for the unit. Track 41 and wheel 43 may serve as a ground return to complete the electrical circuit. A control switch 48 and clutch 49 enable the operator to start and stop the motor 47 and to control the movement of the welding unit 44 along edge 34 of the table.

The welding unit is provided with welding rollers 51 and 52, at least one of which is heated in any manner known in the art. These welding rollers are coupled to the motor 47 so that they will be rotated in coordination with the movement of the welding unit along tracks 40 and 41. Thus, the superimposed sheets of gore material 53 will remain in stationary position on table 31 while the welding unit 44 travels the length of the table and rollers 51 and 52 heat-seal the layers together. These rollers are so designed that they not only seal the superimposed gores to each other but also cut the surplus material away from the gores along the seam line. Details of a welding unit suitable for use in the present apparatus are described and claimed in our co-pending application entitled Welding Apparatus, Serial No. 18,584 filed April 2, 1948.

As shown in Figs. 2 and 3 the gore material 53 may be laid out on the table from a suitable supply roll 54. This supply roll is rotatably carried in a U-shaped bearing 55 suspended from a traveling carriage 56. Carriage 56 is carried by overhead tracks 57 mounted on a suitable frame 58. Thus the carriage may be moved longitudinally over the gore table while the material 53 is unrolled from the supply spool 54. In positioning the material 53 on the table, one edge 59 of material 53 will be aligned with the straight edge 33 of table 31. Thus the material at the other edge will be extended beyond table edge 34 as indicated at 60. If desired, the major portion of this extending material may be cut away by a preliminary trimming operation as indicated at 61 so that the edge of the material will correspond roughly to the shape of table edge 34. The final trimming of this edge of the gore will take place as part of the welding operation as described above.

While the apparatus described herewith involves a welding unit in which a single pair of rollers both cuts and welds the superimposed gores, it will be clear that the cutting and welding operations might be done by separate units, if desired. Also, instead of the additional tracks 40 and 41 attached to the table frame 32, it would be possible to use the shaped table edge 34 itself as the guide for the seaming machine.

Details of Assembly Method

The method by which the gores are assembled and for which the table described above is designed is as follows:

The first two sheets of gore material 53 are superimposed on the table as shown in Fig. 6 with one edge 59 of each sheet in alignment with the straight edge 33 of the table. A series of weights 63 is employed to hold the straight edge of the lower sheet in position and similar weights 64 hold the upper sheet in alignment. The sheets are smoothed across the table 31 so that they extend outwardly beyond edge 34 and another series of weights 65 is utilized to hold the edges in proper relation at this side of the table.

As the welding unit travels along the table the rollers 51 and 52 will both cut and weld the material 53 to form a heat welded seam 66 between the first gore 25—1 and the second gore 25—2. A similar seam 67 will be formed between the extending portions 60 of the respective sheets and these portions of the material will be discarded or utilized for scrap.

After the welding operation, the gore 25—2 is pulled back toward the edge 33 of the table so that the welded joint 66 will be located above a solid portion on the table top 31 as shown in Fig. 7. In this position a reinforcing tape 67 may be applied to the seam as shown in Fig. 8. One end 68 of tape 67 is located beneath the welded seam 66 as shown and the tape then extends outwardly from the apex end of the gores through a ring 69 and back onto the upper side of seam 66 as shown in Fig. 9. Ring 69 is carried by a strap 71 carried by a further ring 72 which is fastened to the table frame at 74 (Figs. 2 and 4) by a suitable connecting cord or wire 73. Similar rings 69 and straps 71 are provided as shown in Fig. 8 for each of the gore seams to be made.

The particular tape utilized for reinforcing the seams 66 is of a pressure-sensitive type so that it may be applied to the seam readily by rolling pressure either manually or by means of a suitable machine. The tape 67 is applied longitudinally of the seam 66 as at 70 all the way from the apex of the gores to the bottom thereof. As shown in Fig. 10, the tape extends beyond the bottom edge of the gores as indicated at 75 and is led through a holding ring 76 and turned back underneath the seam 66 as shown at 77. Ring 76 is fastened to a strap 78 which in turn is fastened to a main tensioning ring 79 in the same way as the straps 71 at the apex of the balloon. Ring 79 is fastened to a cord 80 which passes over pulleys 81 (Fig. 2) and is connected to a tensioning weight 82. It will be apparent that the weight 82 will tend to stretch the tape 67 and thus maintain both the welded joint 66 and the overlapping tape 70 under uniform tension throughout the assembly operation.

An anchor line 83 fastened to ring 79 and to an anchor ring 84 fastened to the table frame at 85 serves to limit the stretching action of weight 82 and thus limits the maximum elongation of the taped seams 70. Thus variations in the length of the tape along the seam due to changes in atmospheric conditions during the assembly of the balloon will tend to be equalized and will not cause serious discrepancies in the lengths of the respective seams which would produce an unsymmetrical shape or wrinkles in the finished balloon. This tensioning arrangement is of definite importance in connection with the assembly of the gores.

After the joint between the first gore 25—1 and the second gore 25—2 is completed and taped as described above, the gores will be shifted to the position shown in Fig. 11 and an additional layer of material 53 will be superimposed on gore 25—2. It will be noted that in the position shown, the first seam 66—1 is aligned with the index mark 35 on table 31 rather than with the edge 33 of the table. In other words, seam 66—1 has been cut to its final shape and therefore must be aligned with the tapering index 35 which corresponds to said final shape. The additional layer 53, since it has straight edges initially, will of course be aligned with the edge 33 of the table. Weights 63, 64, and 65 are again employed to hold the sheet 53 and gore 25—2 in position during the welding operation. In the course of this welding operation, the extending edges 60 of the two layers, which project beyond edge 34 of table 31, will be cut-welded in the manner just described to form a second seam 66—2 between gore 25—2 and the sheet which will constitute the adjacent gore 25—3. This seam will be covered with tape 70—2 in the manner described above in connection with Fig. 9.

It should be noted that in the position of the first two gores in Fig. 11 the tape 70—1 is on the inside of the fold of seam 66—1 when the latter is aligned with index 35. Thus application of the tape 70—2 to seam 66—2 in the manner previously described will result in a construction in which the tapes 70—1 and 70—2 will be on the same surface of the respective gores so that in the finished balloon all the tapes may be located symmetrically on the outside of the envelope.

The process just described is repeated with successive sheets of material 53 and Fig. 12 illustrates schematically the arrangement of the layers after the fourth seam 66—4 and its reinforcing tape 70—4 have been aligned with index 35 and a further sheet of material 53 has been laid out in preparation for the cut-welding of the next seam 66—5. The diagram shows clearly the manner in which the completed gores are gradually fed down into the recessed portion 38 at the center of the table where these completed strips can be accommodated without interfering with the laying-out of the upper layers which are to be welded. Thus, the material can be fed down into the recessed or interrupted portion of the table 31 in a series of accordion-like folds without the problem of manual handling of the partially completed series of gores each time an additional seam is to be made.

Fig. 13 shows schematically the arrangement of the gores after 20 such gores have been united by seams 66—1 to 66—19 inclusive. At this stage of the process the main longitudinal envelope of the balloon is substantially complete, except for the trimming and joining of the straight edge 59—1 of gore 25—1 to the similar edge 59—20 of the last gore. To complete this final seam the leading edge 59—1 is pulled up out of the recess along wall 36 as shown in Fig. 14. Enough of the material is pulled up so that seam 66—1 may be aligned over index mark 35. Similarly, the seam 66—19 is aligned over the index mark and thus the two straight edges 59—1 and 59—20 will extend beyond the edge 34 of table 31 in position for the cutting and welding of the final seam 66—20.

In order to facilitate the inflation of large balloons of this type, we have found it desirable to incorporate a long inflation tube 87 in the body of the balloon. This tube serves to carry the gas with which the balloon is ultimately filled up to the apex of the balloon so that the balloon can be filled uniformly from the top. The tube is subsequently withdrawn before the balloon is released. Such a tube 87 is indicated in Figs. 14, 15, and 16 and may consist of a tubular strip or hose of the same material as the balloon envelope. This tube 87 is positioned on gore 25—19 as shown in Fig. 14 before seam 66—19 is pulled over into alignment with index 35. Thus, the inflation tube is readily incorporated in the balloon before the final seam 66—20 is made and there is no problem of how to introduce such a tube longitudinally from the bottom into a completed envelope.

After seam 66—20 is completed, the gores will be shifted to the position of Fig. 15 so that the final tape 70—20 may be applied. This completes the assembly of the main envelope of the balloon consisting of the longitudinal gores joined at their edges by a heat-sealed or welded seam reinforced by longitudinal tapes. This portion of the balloon in completed form is indicated in Fig. 16 which also shows the general position of the inflation tube. At the apex of the balloon the gores 25 have a definite width at 88 and do not taper to a point. Thus if the upper end of the balloon is flattened on a suitable circular table 90 as shown in Fig. 17, these upper edges 88 of the respective gores will define a suitable circular opening. This opening must be sealed by a suitable cap as described below.

Similarly at the bottom of the balloon the width of the gores at 89 is sufficient to provide a bottom opening of the desired size. The gores at this point will be fastened to the load bearing ring 28 in any desired manner, as, for example, by folding the lower ends of the gores around the ring from the inside out and then taping the folded-over portions in position.

*Modified Balloon Assembly Table*

A modified construction for the balloon assembly table is shown in Figs. 16 and 17. In this case a pair of tables 110 and 111 respectively is employed and these tables are positioned parallel to each other so that their straight edges 112 and 113 respectively are separated by a runway 114 for use of the operators. The outer edges 115 and 116 of the respective tapes are shaped to correspond to the final gores of the desired balloon in the same manner described in connection with the single table above. Each of these tables has a recessed or interrupted central portion 109 just as in the previous case.

A suitable top frame 117 (Fig. 17) is provided with tracks 118 and 119 which support the traveling carriages 120 and 121. These carriages hold the supply rolls 122 and 123 of balloon material just as in the previous case and facilitate the initial lay-out of the material on the respective tables. Tracks 124 and 125 are provided at the outer edge of the tables for a welding unit which may be identical in construction with the welding unit 44. In this modified apparatus tracks 124 and 125 are continuous and extend along each table as well as around the ends of the tables. Thus it is possible with this construction to lay out the superimposed sheets of gore material on the two tables and to run the welding unit along the table 110 in one direction and then back along the table 111 in the opposite direction. Thus a continuous welding process is possible in which the operators may lay out and align the material on one table while the welding machine is forming the seam along the opposite table. This continuous process has obvious advantages in economy of operation and is made possible by the novel arrangement of means to shift the welding roller from one table to the other. As indicated, this means is exemplified by the continuous arrangement of tracks 124 and 125 around the ends of the tables.

According to the foregoing description, a new and improved method for manufacturing balloons has been provided in which a series of longitudinal gores are joined successively at their longitudinal edges after which the leading edge of the first gore is joined to the trailing edge of the final gore to complete the main envelope or body of the balloon. This method of assembling the balloon may include the positioning of the inflation tube prior to completion of the final seam. Such a method is facilitated by the use of apparatus of the type described in which the assembly table has an edge shaped to correspond to the final gore of the balloon and has a recessed or interrupted central portion to accommodate the completed gores as the successive seams are made. The use of a cutting device and welding unit traveling along the gore shaped edge of the assembly table likewise offers advantages in carrying out the method of assembly by minimizing the manual handling of large pieces of gore material.

Since various changes in the specific details of the apparatus will be readily apparent to persons skilled in the art, without departure from the teachings of the present specification, it is intended that this invention shall include all such changes and modifications as fall within the spirit and scope of the following claims.

Now, therefore, we claim:

1. Balloon assembly apparatus comprising a table, a track operatively associated with the table and shaped to correspond to the edge of a gore of the final balloon, and a seaming machine movably mounted on the track for uniting superimposed layers of gore material positioned on the table while the machine travels along the track.

2. Balloon assembly apparatus comprising a table having an edge shaped to correspond to an edge of a gore of the balloon, a supporting track of corresponding shape located parallel to said edge, and a welding unit movably mounted on said track for uniting sheets of gore material superimposed on said table.

3. Balloon assembly apparatus comprising a table, a seaming device, guide means for the seaming device operatively associated with the table for guiding the device along a path corresponding to the shape of a gore edge of the balloon, anchoring means at one end of said table for holding one end of a completed seam against movement longitudinally of the table, and tensioning means at the other end of said table for attachment to the other end of the seam to hold the completed seam under longitudinal tension while a succeeding seam is completed.

4. Balloon assembly apparatus according to claim 3 in which the table has a recessed portion extending longitudinally between the anchoring and tensioning means for accommodation of completed gores and seams.

5. Balloon assembly apparatus comprising a table, seaming means operatively associated with the table for uniting superimposed layers of material along a line corresponding to the desired edge shape of a balloon gore, anchoring means at one end of said table for attachment to one end of a completed seam of the balloon, and tensioning means at the other end of said table for attachment to the other end of said completed seam, said tensioning means holding the completed seam against longitudinal shrinkage during formation of a subsequent seam.

6. Balloon assembly apparatus according to claim 5 in which the table has an interrupted portion extending longitudinally between the anchoring and tensioning means, said interrupted portion receiving the gore material adjacent the completed seam during formation of a subsequent seam.

7. Balloon assembly apparatus according to claim 5 in which said tensioning means includes stop means limiting the maximum longitudinal stretching of the seam.

8. Multiple-gore balloon assembly apparatus comprising a table having an edge shaped to correspond to one longitudinal edge of a balloon gore, a seaming unit for uniting superimposed sheets of balloon material on the table during relative movement of the unit along the table, and interengaging guide means on the seaming unit and table guiding the seaming unit along the table on a path corresponding to said shaped edge.

9. Multiple-gore balloon assembly apparatus comprising a table on which sheets of balloon material may be superimposed, a seaming unit for uniting such superimposed sheets of balloon material during relative movement of the unit along the table, and guide means for the seaming unit operatively associated with the table and guiding the seaming unit along the table on a path corresponding to the desired balloon gore edge shape.

10. Balloon assembly apparatus according to claim 9 in which said table has a longitudinally extending recessed portion into which completed gores and seams may be fed during formation of subsequent seams.

11. Balloon assembly apparatus according to claim 9 in which said table has means for longitudinal alignment of gore material of uniform width on the table, and means defining the shape and relative location of each longitudinally extending edge of a complete gore.

12. Balloon assembly apparatus according to claim 11 in which said means for longitudinal alignment comprises a straight longitudinally extending edge at one side of the table and said defining means includes a shaped edge at the opposite side of the table curved at each end toward the straight table edge and thereby corresponding to the desired balloon gore edge shape, and an oppositely curved index line on the table between said straight edge and said shaped edge, said index line curved at each end toward the shaped edge and defining (with the shaped edge) a complete balloon gore shape.

13. Multiple gore balloon assembly apparatus comprising an assembly table, a carrier for a supply roll of balloon material, track means extending longitudinally of the table and supporting said carrier with the carrier movable longitudinally above the table for laying out superimposed sheets of the material on the table, a seaming unit for uniting such superimposed sheets during relative movement of the unit along the table, and guide means for the seaming unit operatively associated with the table and guiding the seaming unit along the table on a path corresponding to the desired balloon gore edge shape.

14. Multiple gore balloon assembly apparatus comprising a plurality of spaced assembly tables on each of which sheets of balloon material may be superimposed, a seaming unit for uniting such superimposed sheets during relative movement of the unit along each table, and a track operatively associated with said tables and extending in a continuous path along one longitudinal edge of one table and one longitudinal edge of a second table, said track, along each table edge, being curved corresponding to the desired balloon gore edge shape, and said seaming unit engaging said track and thereby moving along said path and forming longitudinal gore seams successively along first one table and then another.

15. Multiple gore balloon assembly apparatus comprising a pair of longitudinally extending laterally spaced assembly tables on each of which sheets of balloon material may be superimposed, a seaming unit for uniting such superimposed sheets during relative movement of the unit along each table, and a track operatively associated with said tables and extending in a continuous path along one longitudinal edge of one table and one longitudinal edge of the second table, said track, along each table edge, being curved corresponding to the desired balloon gore edge shape, and said seaming unit engaging said track and thereby moving along said path and forming longitudinal gore seams alternately along first one table and then the other.

16. Balloon assembly apparatus according to claim 15 in which said tables are substantially opposite and parallel to each other and in which said track extends in a closed continuous path along said one edge of one table, across to the second table, along said one edge of the second table and back across to said one table, said seaming unit being movable along said closed path in the same given direction during formation of successive seams alternately on said tables.

FRANK J. LA MERE.
KERMIT F. JOHNSON.
OTTO C. WINZEN.

References Cited in the file of this patent
UNITED STATES PATENTS

| Number | Name | Date |
| --- | --- | --- |
| 748,476 | Bryce | Dec. 29, 1903 |
| 2,483,707 | Magee | Oct. 4, 1949 |
| 2,525,749 | MacCaffray | Oct. 10, 1950 |